United States Patent [19]

Woods et al.

[11] 4,296,464
[45] Oct. 20, 1981

[54] PROCESS CONTROL SYSTEM WITH LOCAL MICROPROCESSOR CONTROL MEANS

[75] Inventors: Rodney G. Woods, Glendale; Charles J. Clarke, Jr.; Robert C. Sodergren, both of Phoenix, all of Ariz.

[73] Assignee: Honeywell Inc., Minneapolis, Minn.

[21] Appl. No.: 773,913

[22] Filed: Mar. 3, 1977

[51] Int. Cl.³ .............................................. G06F 9/22
[52] U.S. Cl. .................................................. 364/200
[58] Field of Search ........ 364/200 MS File, 900 M.S. Files, 364/300, 101, 102, 119, 550, 551, 508

[56] References Cited

U.S. PATENT DOCUMENTS

| | | | |
|---|---|---|---|
| 3,142,820 | 7/1964 | Daniels | 364/550 |
| 3,541,513 | 11/1970 | Paterson | 364/200 |
| 3,626,385 | 12/1971 | Bouman | 364/200 |
| 3,648,256 | 3/1972 | Paine | 364/900 |
| 3,676,846 | 7/1972 | Busch | 364/200 |
| 3,693,163 | 9/1972 | Johnson et al. | 364/200 |
| 3,723,973 | 3/1973 | Kennedy | 364/200 |
| 3,725,871 | 4/1973 | Heuttner et al. | 364/200 |
| 3,806,878 | 4/1974 | Edstrom | 364/200 |
| 3,820,079 | 6/1974 | Bergh et al. | 364/200 |
| 3,969,723 | 7/1976 | Kennicott | 364/200 |
| 3,972,030 | 7/1976 | Bailey, Jr. | 364/200 |
| 4,003,033 | 1/1977 | O'Keefe et al. | 364/200 |
| 4,017,839 | 4/1977 | Calle et al. | 364/200 |
| 4,027,289 | 5/1977 | Toman | 364/900 |
| 4,064,490 | 12/1977 | Nagel | 364/900 |
| 4,100,601 | 7/1978 | Kaufman et al. | 364/200 |
| 4,123,794 | 10/1978 | Matsumoto | 364/119 |
| 4,161,027 | 7/1979 | Russell | 364/119 |

FOREIGN PATENT DOCUMENTS 2522343  12/1976  Fed. Rep. of Germany ...... 364/101

OTHER PUBLICATIONS

"Computer Organization and the System/370" by Harry Katzan, Jr., p. 155, Van Nostrand Reinhold Co., (pub.), copyright 1971.

Primary Examiner—Harvey E. Springborn
Attorney, Agent, or Firm—Laurence J. Marhoefer; Lockwood D. Burton

[57] ABSTRACT

In a computer control system a central processor unit (CPU) is provided as a primary control center. A data bus interface controller is connected to interface between the CPU and a serial data communication bus. The interface control unit controls the traffic on the data bus as well as interfacing the format between serial data on the data bus and the parallel data receivable by the CPU. A plurality of process interface units are connected to the serial data bus. Each of these process interface units (PIU) has a plurality of process input/output devices connected thereto and controlled thereby. The PIU's exercise a significant amount of control capability including having an internal microprocessor unit. By performing many of the functions heretofore provided by the central processor unit, the PIU significantly reduces the amount of data which must be transmitted via the serial data bus to the CPU. By requiring the data bus only for reporting of change signals, or data requested by the CPU, further economies in the use of the data bus are effected. By thus reducing the amount of data that must be transmitted on the data bus, more efficient use is made of both the CPU and the communication bus. The PIU includes facilities for scanning all of the input/output devices associated therewith; manipulating the gathered data to perform such operations as offset correction, gain optimization, linearization where needed, sequence of events tabulation, reasonableness testing, digital smoothing, process limit testing, normalization, scan frequency controlling and cold junction compensation where needed; the storing of the results in local memory for transmission to the CPU through the bus interface control unit. It has the capacity to request access to the communication bus when required. When access to the bus is acquired by the CPU, gathered data may be transmitted in block form or on a word-by-word basis as required.

18 Claims, 9 Drawing Figures

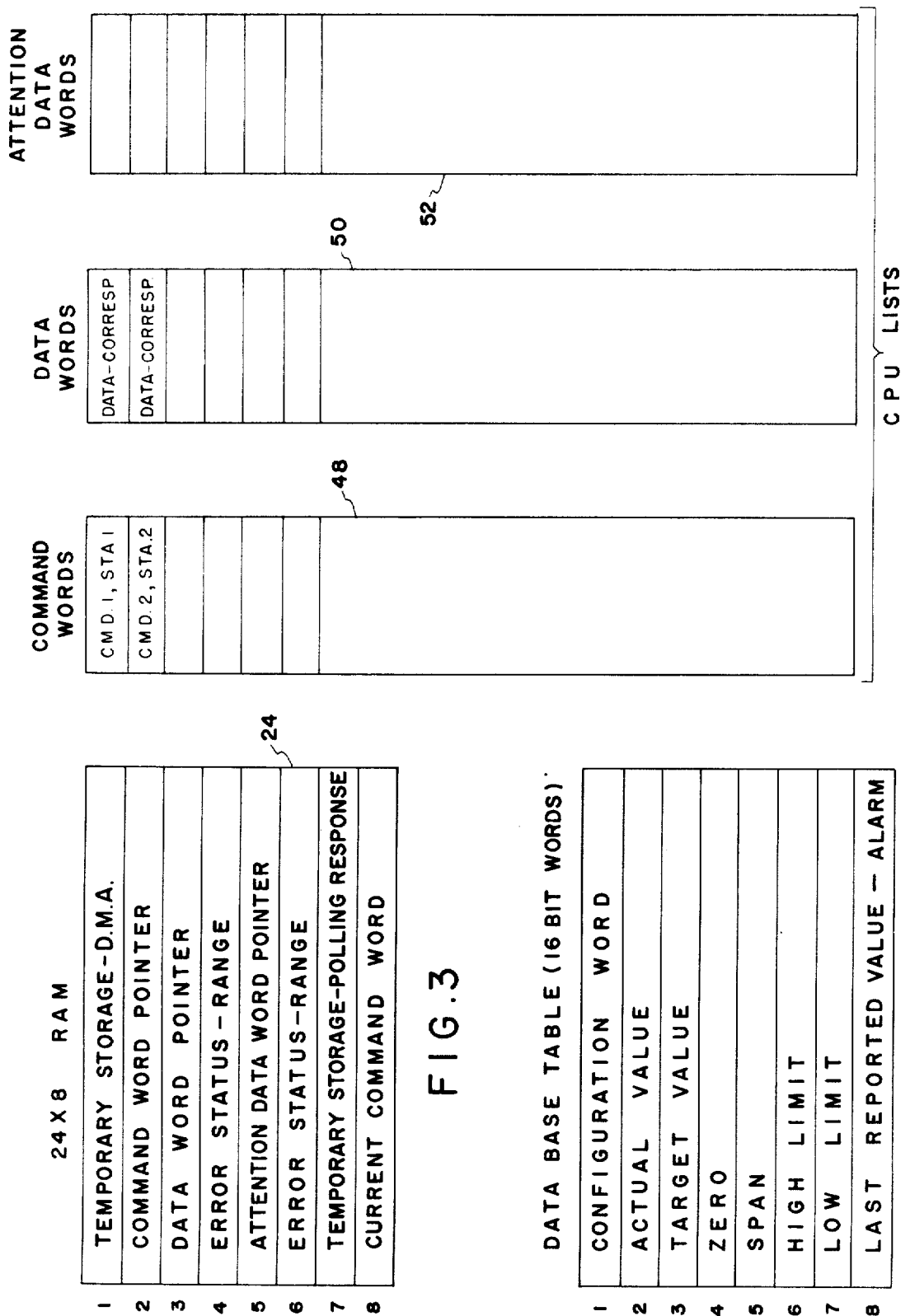

PROCESS CONTROL SYSTEM WITH LOCAL MICROPROCESSOR CONTROL MEANS

BACKGROUND OF THE INVENTION

1. Field of the Invention

The present invention relates to a computer control system, and, more particularly, to a hierarchial control system.

2. Description of the Prior Art

In the art of process control instrumentation, various levels of computer based technology have been employed in accomplishing the desired control. At the lower end, there have been provided small microcomputers which are dedicated to the particular control function. At the other end, there are large computers which may be of the general purpose type and which exercise direct control of the ultimate control functions. At the lower end, the dedicated smaller units are limited in capacity, versatility and scope. In the larger units, the direct control of the input/output functions becomes cumbersome.

At an intermediate level, there has been provided a distributed control system wherein a large scale computer comprises the primary system control, while lower level control functions are effected by lower level dedicated control computers. In the known systems heretofore provided, there have been various shortcomings of the intermediate control level which interfaces the main computer with the ultimate control function. In some such apparatus, the intermediate control apparatus has not the capability to gather, store, or manipulate raw data but must transmit that raw data, word by word, to the central processor.

Other such apparatus, while providing for manipulation of the raw data, has no provision for gathering and storing process data, nor can it originate a request for access to the central processor unit. Data is accessed to the central processing unit by directly addressing the ultimate control or sensing function from the CPU.

Although both of the referenced devices represent a significant advance over otherwise extant prior art, there is room for improvement in the area of flexibility, versatility and economy of time and apparatus.

When the central processor is located at, for example, a control room, and the lower level instrumentalities are located at a substantial distance from that control room, interconnecting multiconductor cables become cumbersome and very expensive. Accordingly, it has been found desirable to use a two conductor, preferably coaxial, data bus to interconnect the remote units with the central processor unit. The use of such a two conductor bus, of course, requires that the data on the bus be transmitted in serial form. When the data is transmitted in serial form, it must entail a substantial reduction in the speed of transmitting data to and from the central processor unit with respect to all of the remote data points. Heretofore, in the interest of economy, the speed of transmission has been sacrificed.

SUMMARY OF THE INVENTION

It is, accordingly, an object of the present invention to provide an improved distributed control system.

It is another object of the present invention to provide an improved control system which features greater versatility at the lower control level.

It is a further object of the present invention to provide an improved control system as set forth which features greater economy of time in communicating with the central processor unit, and in which communication is established between transmission systems using different data formats.

It is yet another object of the present invention to provide an improved control system as set forth which features improved speed of communication between lower level control units and a central processor.

In accomplishing these and other objects, there has been provided, in accordance with the present invention, a central processor unit (CPU) as a primary control center. The CPU has a relatively short communication bus which is a multiconductor, parallel data transmission line. Connected to that bus there is a data bus interface controller which converts the data in one format on one communication bus to a different format on a second communication bus. That interface controller also exerts some control over the transmission of data between the two communication bus systems and has direct memory access with the CPU. The second communication bus, a two conductor serial data bus, has connected thereto a plurality of process interface units (PIU). The PIU's exercise a significant amount of control capability including having an internal microprocessing unit. By performing many of the functions heretofore provided by the central processor unit, the PIU significantly reduces the amount of data which must be transmitted via the serial data bus to the CPU. By requiring the data bus only for reporting of change signals, or data requested by the CPU, further economies in the use of the data bus are effected. By thus reducing the amount of data that must be transmitted on the data bus, more efficient use is made of both the CPU and the communication bus. This enables the accomplishment of the economy of serial data bus or highway while increasing the effective speed of the service between remote units and the CPU. The PIU includes facilities for scanning all of the input/output devices associated therewith; manipulating the gathered data to perform such operations as offset correction, gain optimization, linearization where needed, sequence of events tabulation, reasonableness testing, digital smoothing, process limit testing, normalization, scan frequency controlling and cold junction compensation where needed; and storing the result in local memory for transmission to the CPU through the bus interface control unit. It has the capacity to request access to the communication bus when required. When access to the bus is acquired by the PIU, gathered data may be transmitted in block form or in a word by word basis as required. Because of the unique structure of the PIU, a great many more data points can be accommodated by the one controller.

BRIEF DESCRIPTION OF THE DRAWINGS

A better understanding of the present invention may be had from the following detailed description when read in the light of the accompanying drawings, in which:

FIG. 3 is a diagram of the structure of the RAM for the apparatus shown in FIG. 2;

FIG. 4 is a diagram of a set of data lists in the main memory of the CPU with which the bus interface controller communicates;

FIG. 7 is a diagram of the structure of the database portion of the RAM shown in FIG. 6 for an analog input device;

DETAILED DESCRIPTION

Figure 1:
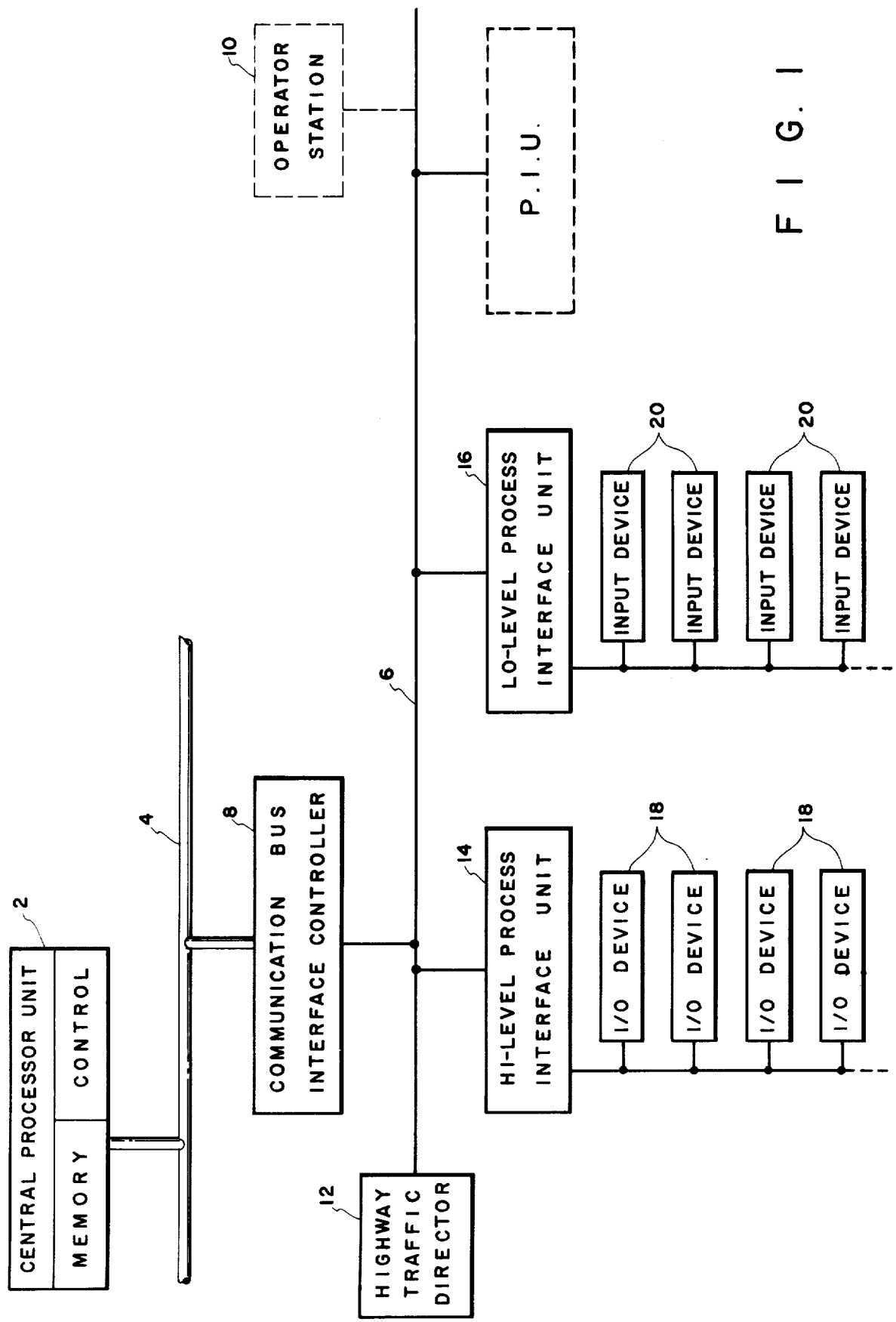
FIG. 1 is a block diagram of a computer control system embodying the present invention.

Referring now to the drawings in more detail, there is shown in FIG. 1 a central processor unit (CPU) 2. The central processor unit 2 comprises the primary control, basic computer. The CPU 2 includes the main memory store for the system and primary arithmetic logic unit by means of which the ultimate computational manipulations are made both as to program control and utilization of the accumulated data as well as the issuance of control commands for the ultimate process control output devices. This CPU 2 stores and operates upon the primary program control data as well as storing and applying the control algorithms for the ultimate control system. The central processor unit 2 is connected to the rest of the system by a communication bus 4 which is in the nature of a multiple conductor, parallel data transmission line. Intelligence data including command signals, address signals and data signals are transmitted to and from the central processor unit 2 by way of the communication bus 4 in simultaneous or parallel format. A second communication bus 6 is provided to effect communication with the lower level elements of the system. The communication bus 6 may be, and preferably is, of the two conductor, preferably coaxial cable, serial data transmission line type. It has been identified in the art as a data highway. For direct communication with the CPU 2, in a short distance arrangement, the multiple conductor, parallel data transmission communication bus is most economically practical. On the other hand, for communication with the lower level units which may be at a substantial distance from the CPU, the two conductor communication bus is more economically desirable. Interfacing between the communication bus 4 and the communication bus 6 is a communication bus interface controller 8.

The bus interface controller 8 includes means for translating the parallel data from the communication bus 4 to serial data for transmission on the data highway communication bus 6, and for converting the serial data from the highway 6 to parallel data for transmission onto the bus 4. Command signals from the CPU to the lower level units are transmitted through the bus interface controller and responses from the lower level units are transmitted to the central processor by way of the bus interface controller 8. Another feature of the bus interface controller 8 is that it has a direct memory access relationship with the main memory in the CPU 2. Additionally, the bus interface controller 8 exercises control over the traffic on the highway bus 6 when no other traffic director is employed. If there is connected to the data highway 6 an operator station 10 which is unique to the data highway system, then a suitable highway traffic director 12 is required. If such a highway traffic director 12 is employed, the control of the traffic on the data highway 6 is controlled by the traffic director 12, and the communication bus interface controller serves primarily as a translator with respect to the bus 6. In the absence of such a traffic director 12, all of the traffic on the data highway bus 6 is controlled by the interface controller 8.

Connected to the data highway communication bus 6 there is a plurality of process interface units (PIU) such as a high level process interface unit 14 and a low level process interface unit 16. Each of the process interface units 14 and 16 includes a relatively high level of control intelligence, including microprocessor control modules as well as internal memory. The high level process interface unit controls the operation of a plurality of input/output or data point devices 18. The input/output devices 18 may be connected to process variable measuring circuits and/or process control elements. The "high level" significance here is that the signals operated upon are of a relatively high level, on the order of volts with a capability to effect millivolt resolution. In the low level process interface unit 16, the "low level" refers to the relatively low level of the signals acted upon, those signals being in the millivolt range with a capability to effect microvolt resolution. The low level process interface unit controls the operation of a plurality of data input devices 20. While two particular types of process interface units 14 and 16 have been referenced herein, it will be appreciated that a number of other process interface units, either of the same type as those herein described or others having differing specific purposes, may be included.

Figure 2:
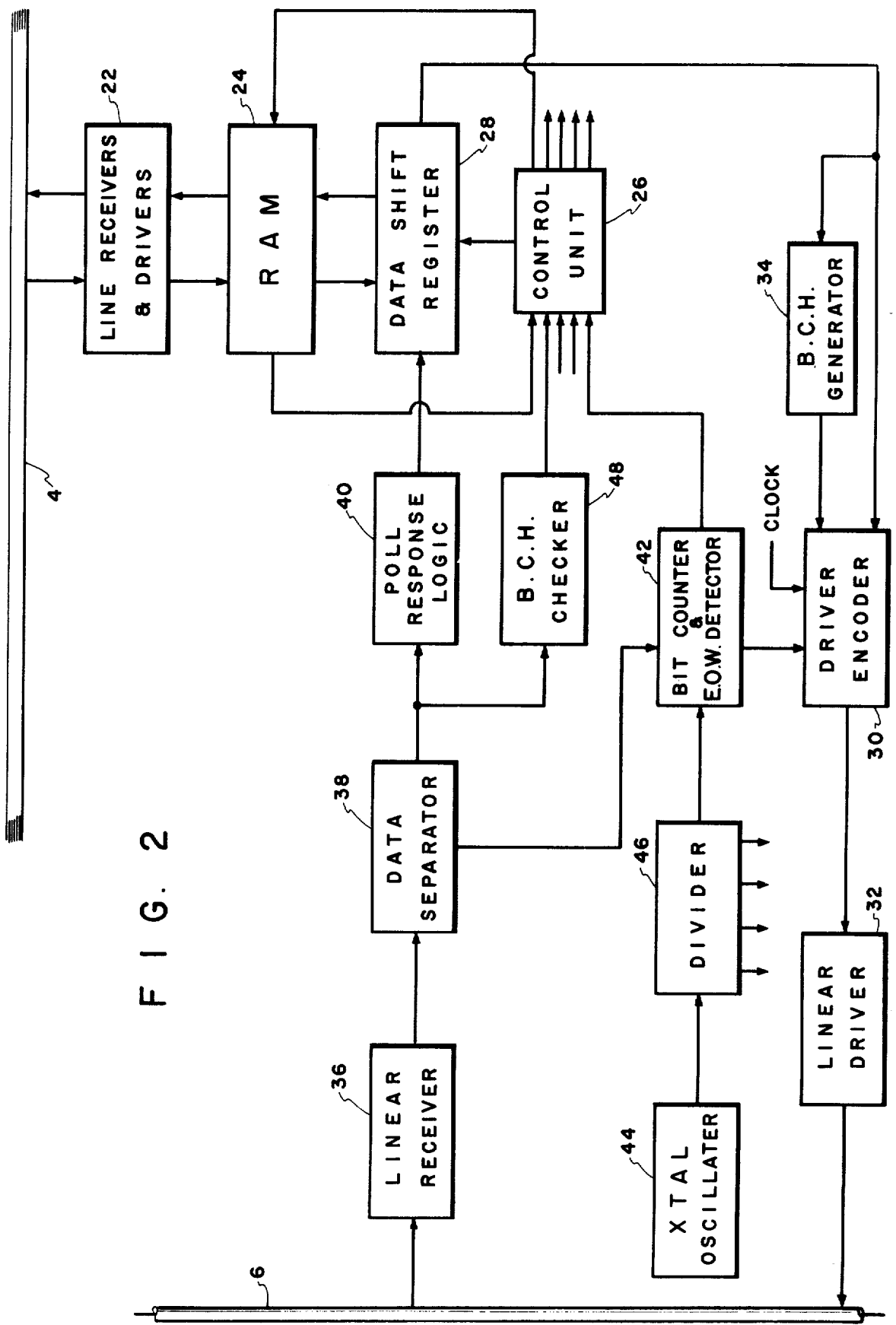
FIG. 2 is a block diagram of a communication bus interface controller shown in FIG. 1.

In FIG. 2 there is shown a block diagram of significant components of the communication bus interface controller 8 shown basically in FIG. 1. The parallel data communication bus 4 has connected thereto a plurality of line receivers and drivers 22. These drivers and receivers are conventional units such as the drivers and receivers shown in U.S. Pat. No. 3,983,540. These are arranged to receive data from each of the lines of the communication bus 4 or to apply signals to each of those lines, respectively. A random access memory (RAM) 24 receives the data from the line receivers or supplies data to the line drivers in the unit 22 under control of a control unit 26. The control unit 26 is a medium scale integrated circuit and is controlled from the CPU 2 from internal time sequence control or from data signals; it is identified in words of art as a "firmware engine." As will be seen hereinafter, the RAM 24 is an eight word memory of twenty-four bits each. In communication with the RAM 24 is a data shift register 28. The data shift register also operating under control of the control unit 26 receives data in parallel form from the RAM 24 and transmits that data out in serial form through a driver encoder 30 and a line driver 32 to the serial data communication bus or data highway 6. The driver encoder is a conventional logic circuit which is timed to combine the data bits with derived security bits to provide a proper word for transmission on the bus 6. The line driver 32 may also be of the type shown in the aforementioned U.S. Pat. No. 3,983,540. The data transmitted to the driver encoder 30 are also fed to a BCH code generator 34 to produce an error check code which is combined with the data signal in the encoder 30 to form the transmitted data signal. The BCH code generator 34 is a conventional security code circuit which may comprise a plurality of parallel tree logic circuits as shown in the book "Error Detecting Logic for Digital Computers" by Frederick F. Sellers.

Data is received by the shift register 28 from the data highway 6 by way of a linear receiver 36, data separator 38, and a poll response logic unit 40. The receivers 36 may also be of the type shown in the aforementioned U.S. Pat. No. 3,983,540. The data separator 38 is conventional digital logic for separating the data portion of the received word from the initial clock pulse and the like. The poll response logic 40 may be of the type shown in copending application Ser. No. 812,692 in the name of Charles Diefenderfer, now U.S. Pat. No. 4,149,144. The signals from the data highway 6 are in the form of serial bits forming a predetermined word length. These serial bits are received and amplified by the linear receiver 36 and are transmitted to the data separator 38. In the chosen format for the signals on the data highway, a clock signal is derived from the data signal bits. In the data separator 38, the clock signal is separated from the data signal. The clock signal is then transmitted to a bit counter and end-of-word detector 42. A crystal oscillator 44 is driven to provide a basic frequency timing signal. The output of the crystal oscillator 44 is applied to a frequency divider 46. The frequency divider 46 provides several sub-multiples of the basic frequency applied by the crystal oscillator, which sub-multiples may be used for controlling and timing different elements of the interface circuitry. One of those sub-multiple frequencies is applied to the bit counter and end-of-word detector 42. The end-of-word detector 42 is a conventional counter which is enabled by the clock pulse from the data separator 38 and counts a predetermined number of bits or pulses from the frequency divider 46 to provide an end-of-word pulse. When the bus interface controller 8 is reading signals from the highway bus 6 the bit counter and end-of-word detector 42 counts the bits in the word being received and supplies a signal to the control unit 26 on the occurrence of The end of the word. The unit 26 then exercises its control over the system to execute the next phase of its operation which may, for example, be to shift the received data out of the shift register into the RAM 24 for transmission to the parallel data bus 4 which, in turn, communicates with the CPU. On the other hand, when data is being transmitted out of the shift register 28 to be applied through the linear driver 32 to the data highway bus 6, the bit counter 42 counts the corresponding bits supplied from the frequency divider 46 as an indication of the number of bits transmitted through the driver encoder 30 and the linear driver 32. Again, when the bit counter has indicated that the number of bits corresponding to a word has been transmitted, the end-of-word detector again supplies a signal to the control unit 26, signifying the end of a word.

When data words are transmitted on the data highway 6, the word includes a security code of a predetermined number of bits known as the BCH bits. As the word is received from the data highway 6 through the linear receiver 36 and the data separator 38, the word is applied not only to the poll response logic unit 40 but also and simultaneously to a BCH checker 48. The BCH checker 48 may also be of a structure of the type set forth in the aforementioned book by Frederick F. Sellers and tests each received word for validity in accordance with the BCH code. It then sends a signal to the control unit 26 signifying that the word is valid or invalid. An invalid word is flagged as invalid. Similarly, words that are received from the parallel data communication bus 4 are transmitted out of the shift register with the raw data bits. These data bits are applied simultaneously to the driver encoder 30 and a BCH code generator 34 where the security bits are generated. These security bits are added to the data bits in the driver encoder 30 where the signal is composed and formatted in a proper form for transmission by the linear driver 32 to the data highway communication bus 6. Another function of the control unit 8 is to periodically test the data highway bus 26 for ongoing traffic, and to transmit a polling request signal along the bus 6, addressed as a "global command" to all of the PIU's connected to that bus. Any PIU that has data that must be transmitted to the CPU, responds to that poll request with a time slot identifying response signal.

In FIG. 3 there is shown a representation of the structuring of the RAM 24 which is an element of the communication bus interface unit 8. In an apparatus constructed in accordance with the present invention, each communication word transmitted to or from the RAM 24 by the parallel data bus 4 includes a twenty-four bit data word. Accordingly, the RAM is established to store a plurality of twenty-four bit words. In the RAM of the exemplary system, there were provisions for accommodating eight such words. Before describing the structural content of the RAM 24, it will be helpful to make reference to a portion of the structure of the main memory of the CPU. In the memory of the CPU, provision is made for accommodating a plurality of lists such as is shown in FIG. 4. The first list 48 is a list of command words which are stored in the memory list as a function of the instrumentation software. In other words, the several command words and their sequence are inserted in the command word list under control of the CPU. The second list 50 is a provision for a sequence of data words which are inserted into that list as a function of the execution of the command word in a corresponding position in the command word list 48. A third list 52 is a list of attention data words about which more will be said later.

Figure 5:
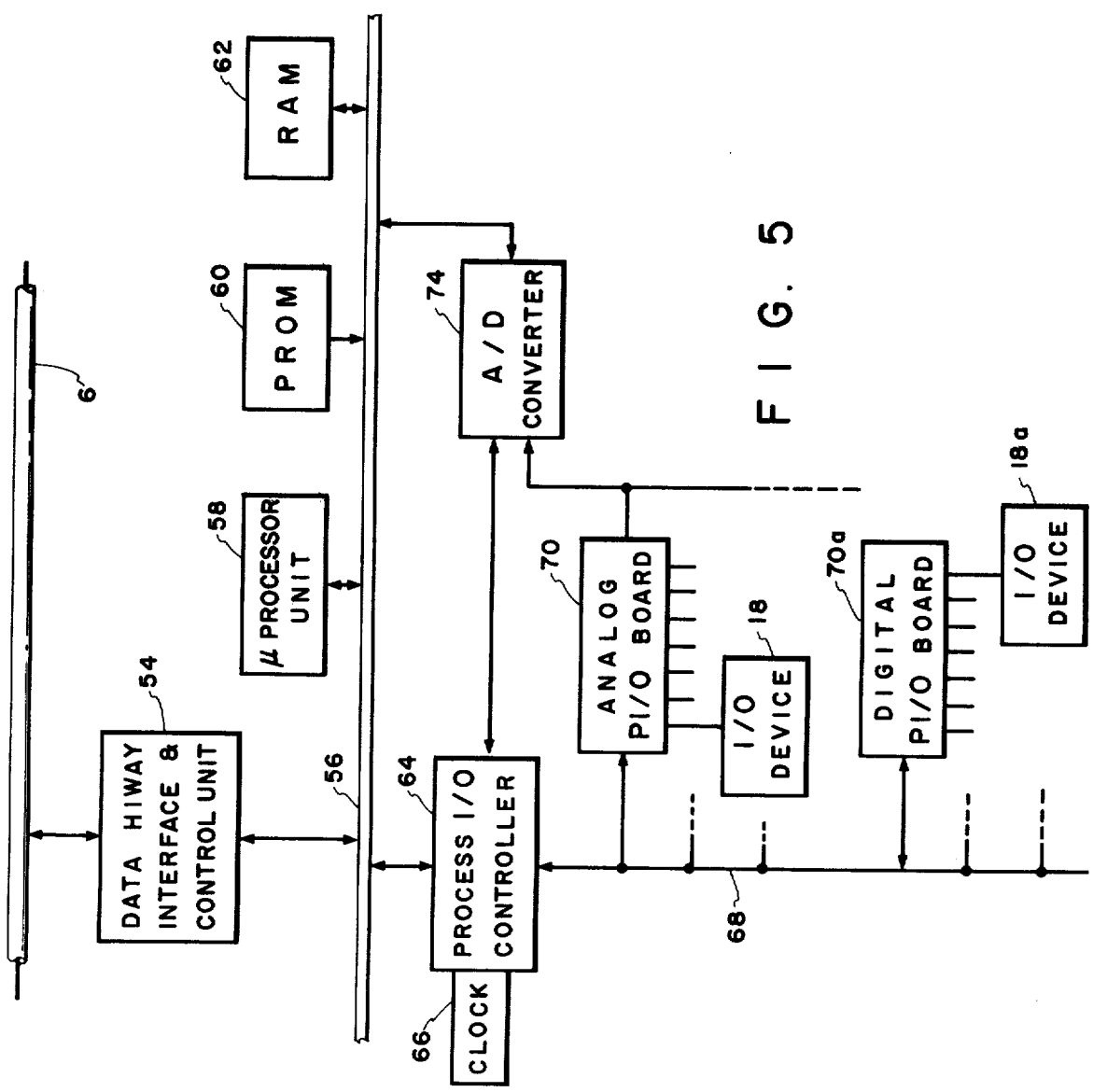
FIG. 5 is a block diagram of a process interface unit shown in FIG. 1.

Referring, now, back to FIG. 3, the structure of the content of the RAM 24 may be discussed. It will be remembered that the communication bus interface controller 8 provides direct memory access to the main memory in the CPU 2. The first address in the RAM 24 is a temporary storage for a word to be transferred directly to the main memory via the direct memory access route. The second address of the RAM 24 is a command word pointer which contains the address of the next command word in the list 48 to be transmitted downward to the subordinate units. The third address in the RAM 24 is a data word pointer and includes the address in the data word list where the next data word will be stored in CPU memory. The fourth address in the RAm 24 includes two information signals, the first being an error status signal which will be a signal generated by the control unit 26 to indicate that the word to be transmitted is a valid word or includes an error of some sort. The second information signal in the fourth address of the RAM 24 is the range or length of the lists reserved in the memory for the command words and data words. The fifth address in the RAM 24 is an attention data word pointer and includes the address on the attention data word list 52 in which the next attention word is stored. The next address in the RAM 24 again includes the two information signals the first being an error status signal relative to the attention data word; and the second, the range or length of the attention data word list. It will be recalled that data received from the serial data highway bus 6 was passed through a poll response logic unit 40. If, following a poll signal transmitted to the subordinate units connected to the communication bus 6, one of those subordinate units had indicated that it has information to be transmitted to the CPU, a polling response signal will have been generated and stored in the seventh address in the RAM 24. The eighth address of the RAM 24 contains the current command word presently being acted upon. In FIG. 5, there is shown a block diagram of a process interface unit (PIU) such as the unit 14 of FIG. 1. The process interface unit 14 controls an interface between the serial data communication bus and the input/output or data point devices. The process interface unit includes a data highway interface and control unit 54 connected to the communication bus 6 to control the transmission of data to and from that bus with respect to the lower level units. The interface and control unit 54, which also includes a medium scale integrated micro control circuit or "firmware engine", communicates with an internal bus 56 which may be referred to as a microprocessor bus. Also communicating with the bus 56 is, indeed, a microprocessor unit 58 which is, indeed, a large scale integrated circuit microprocessor and may be of the commercially available type GI 1600 manufactured by General Instruments Corporation. The microprocessor unit 58 effectively controls the operation of the process interface unit in accordance with predetermined instructions stored in a programmable read only memory (PROM) 60 which communicates with the microprocessor unit by way of the bus 56. There is also provided a working memory or random access memory (RAM) 62. The PROM 60 and the RAM 62 are conventional units well known to those skilled in the art and are commercially available.

Responsive to the control of the microprocessor unit is a process input/output controller 64 having associated therewith a clock 66. The process I/O controller 64 controls the traffic on an I/O bus 68 which constitutes the communication link with a plurality of process I/O boards. In the exemplary system previously referenced herein, the process I/O controllers have the capacity for accommodating up to thirty-two such process I/O boards 70. Each of the boards 70 include the signal conditioning circuitry for each of a plurality of input/output devices 18. Again, in the exemplary system, each of the process I/O boards have the capacity for accommodating up to eight analog process I/O devices or sixteen digital I/O devices. The process I/O devices may comprise sources of process parameter signals representative of process variables such as temperature, pressuree, flow, etc. As output units, the devices 18 may comprise an ultimate control element such as a valve actuator or the like. It will be appreciated that the input or output devices may either be of the analog signal type 18 or a digital signal type 18a. If the signals are of a digital type, then communication between the process I/O controller 64 and the digital process I/O board 70a is directly through the bus 68. On the other hand, if the I/O device 18 is of an analog type, then communication from the input device through the analog process I/O board 70 to the process I/O controller 64 must be through an A/D converter 74. The A/D converter 74 is operated under the control of the microprocessor unit 58 by way of the microprocessor bus 56. The A/D converter 74 communicatees directly with the process I/O controller 64.

It will be recalled that the process I/O controller of the exemplary apparatus has the capacity for communicating with thirty-two of the analog process I/O boards; each process I/O board, in turn, having the capacity for handling up to eight analog data points or I/O devices 18. In the RAM 62, which comprises the working memory for the process interface unit, there are dedicated addresses for data base information for each of the resulting 256 data points. In the case of analog input devices, the data base table provides an eight word data base for each of the 256 data points or a total of 2,048 words in the data base tables. Each of the words is a sixteen bit word. Each address of the RAM in the data base tables is addressable from the data highway communication bus 6, hence, from the CPU 2. Again, in the exemplary model, the RAM 62 also included another thousand addresses of memory which are not highway addressable but are accessible only through the internal microprocessor unit 58 of the process interface unit 14/16. This additional memory provision includes a section allocated to (1) a scratch pad memory, (2) pointers, (3) alarm tables, and (4) special reports.

In FIG. 7, there is illustrated the structure of an individual one of the analog data base tables in the RAM 62. Each of the analog data base tables for the 256 data points is substantially identical in structure. All of the words in the RAM 62 are 16 bit words. As illustrated in FIG. 7, the structure of each of the analog data base tables for the 256 data points includes a table of eight words. The first word of the table is a configuration word which identifies, among other things, the type of sensor or actuator associated with the data point, a reporting deadband index, a scan frequency, smoothing coefficient, and the like. The second word of the analog data base table is the actual measured value after having been manipulated in accordance with the appropriate normalizing and linearizing characteristics. The third address in the data base table is a target value. The fourth address is for the zero value which, in effect, identifies the lower end of the range of values to be reported. The fifth address in the data base table, contains the span value which, in effect, defines the upper end of the range of the signals to be reported. The sixth and seventh addresses contain, respectively, a high limit value and a low limit value. These criteria, in effect, define alarm limit conditions. The eighth address contains the last reported value of the data.

While the data base table for analog input data points has been illustrated, it will be appreciated that the format of data base tables for other types of data points will be significantly different. For example, in a Status Only reporting of digital inputs, all sixteen of the input points could be accommodated in a single word in the data base table. Data points associated with either analog or digital output devices will have a simpler data base configuration. For digital input devices, the digital counts may be accumulated at one place in the data base table and stored in another, with a count limit defined in a third location of the data base table.

With regard to the analog data base table, the second word—the measured value—is of particular interest. It is noted that the measured value has been manipulated. It is that manipulation which contributes significantly to the present system. In previous systems, the raw measured data was transmitted back to the host computer or CPU for such manipulation as offset correction, gain optimization, linearization reasonableness testing, digital smoothing, process limit testing, normalization, scan classification and/or cold junction compensation. That entailed a great amount of traffic on the data bus or highway and a large amount of activity by the CPU to effect the manipulations. In the present system all of those functions are performed by the microprocessor 58 in the PIU. Again, in previous systems, if a Sequence of Events function was available, it was accomplished at the CPU, again entailing much data bus traffic and CPU activity. In the present system, the entire Sequence of Events routine is accomplished at the PIU and the accumulated data is transferred in block transfer format to the CPU.

Figure 8:
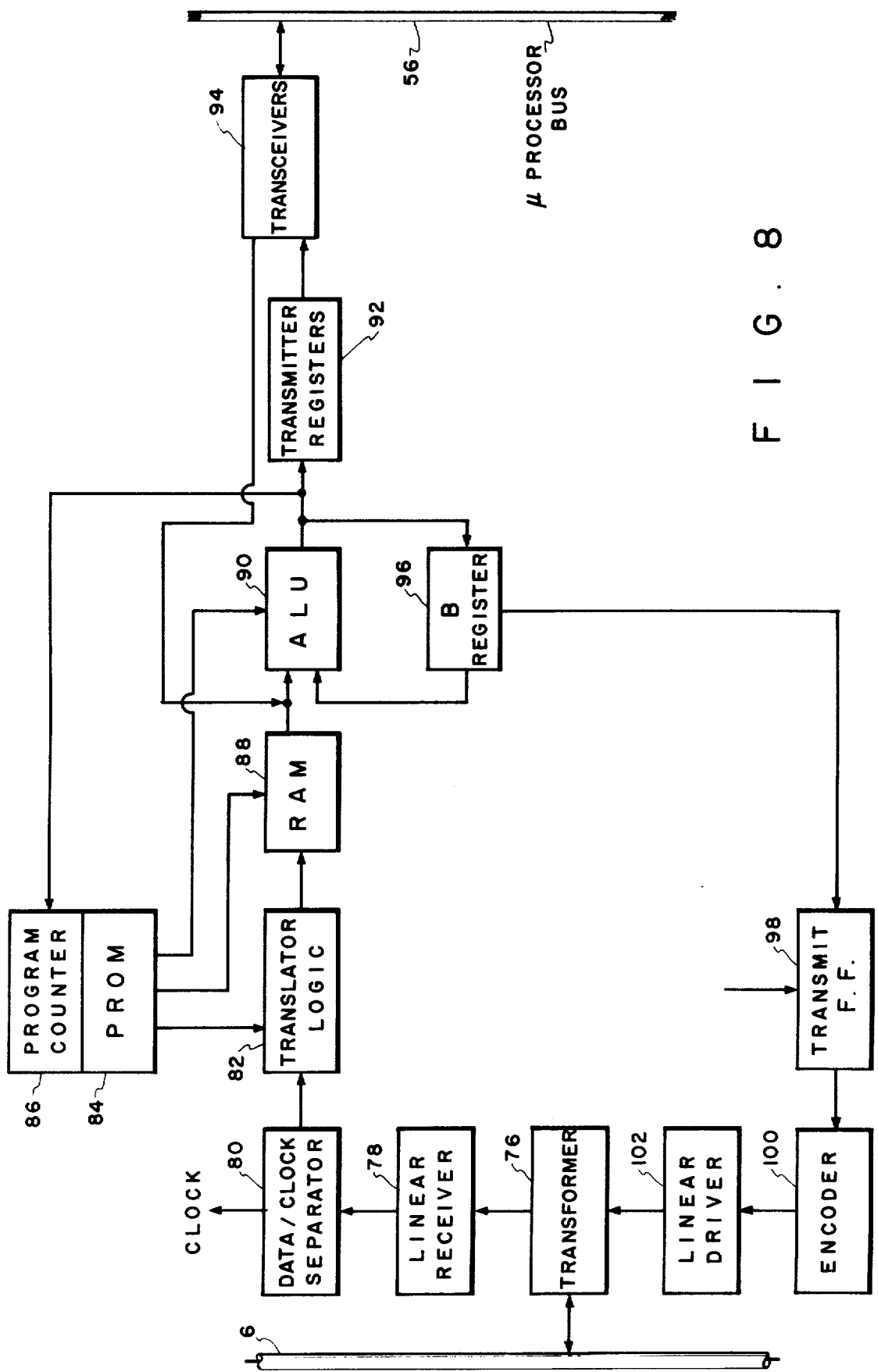
FIG. 8 is a block diagram of the interface and control unit portion of the apparatus shown in FIG. 5.

Also included in the process interface unit 14 and 16 illustrated in FIGS. 1 and 5, is a data highway interface and control unit 54. The control unit 54 is shown in greater detail in FIG. 8. The data highway communication bus 6 is coupled to the system through a transformer means 76. In the receive mode, the transformer signal is applied to a linear receiver unit 78 which effectively is an amplifier for the transmitted signal. The signals from the linear receiver 78 are then applied to the input of a data/clock signal separator unit 80. The data signals are then transmitted to a translator logic circuit, 82 which includes an assembly of logic elements including controlled gates and flip-flops for determining the structure of the received word and passing the translated word on to subsequent units. The translator logic circuit operates under the control of a PROM 84, (a conventional memory unit) in which are stored a number of control functions for the operation of the highway interface and control unit 54. The PROM 84 is, in turn, sequenced by a counter 86, a simple digital counter which steps the sequencing of the PROM 86. The output of the translator logic circuit 82 is, under the control of the PROM 84, shifted into a RAM 88, a conventional logic memory unit; signals from the RAM 88 are, in turn, transmitted to an arithmetic logic unit (ALU) 90, which may be a commercially available unit identified as a type SN74S181. The arithmetic logic unit 90, also under the control of the PROM 84, manipulates the signals transmitted thereto from the RAM 88 in accordance with the instructions received from the PROM 84 and controls the branching of the sequence. The output of the ALU 90, in transmit mode, is fed to a transmitter register 92 which, in turn, feeds the line drivers of a transceiver unit 94. The line drivers of the transceiver unit 94 transmit the data to the microprocessor bus 56.

On the other hand, when signals are received from the microprocessor bus and applied to the receiver elements in the transceiver unit 94, the output signals from those transceiver units are applied to the input of the ALU 90 where the signals are again manipulated in accordance with instructions from the PROM 84 and the output data stored in a B-register 96. Such data, when properly assembled in the B-register, is transmitted to a transmit flip/flop 98 which is controlled to respond to signals received from the microprocessor bus 56. The signals transmitted by the flip/flop 98 are passed to an encoder 100, conventional logic where the signals are placed in proper format, including a BCH code, for transmission to the highway bus 6. The output of the encoder 100 is fed to a linear driver unit 102, thence to the transformers 76 for application to the bus 6. In both the transmit and receive mode of operation, the B-register 96 cooperates with the ALU 90 in the manipulation of the data applied thereto. An output signal from the ALU is also applied to the program counter 86 to effect incrementation thereof.

Figure 9:
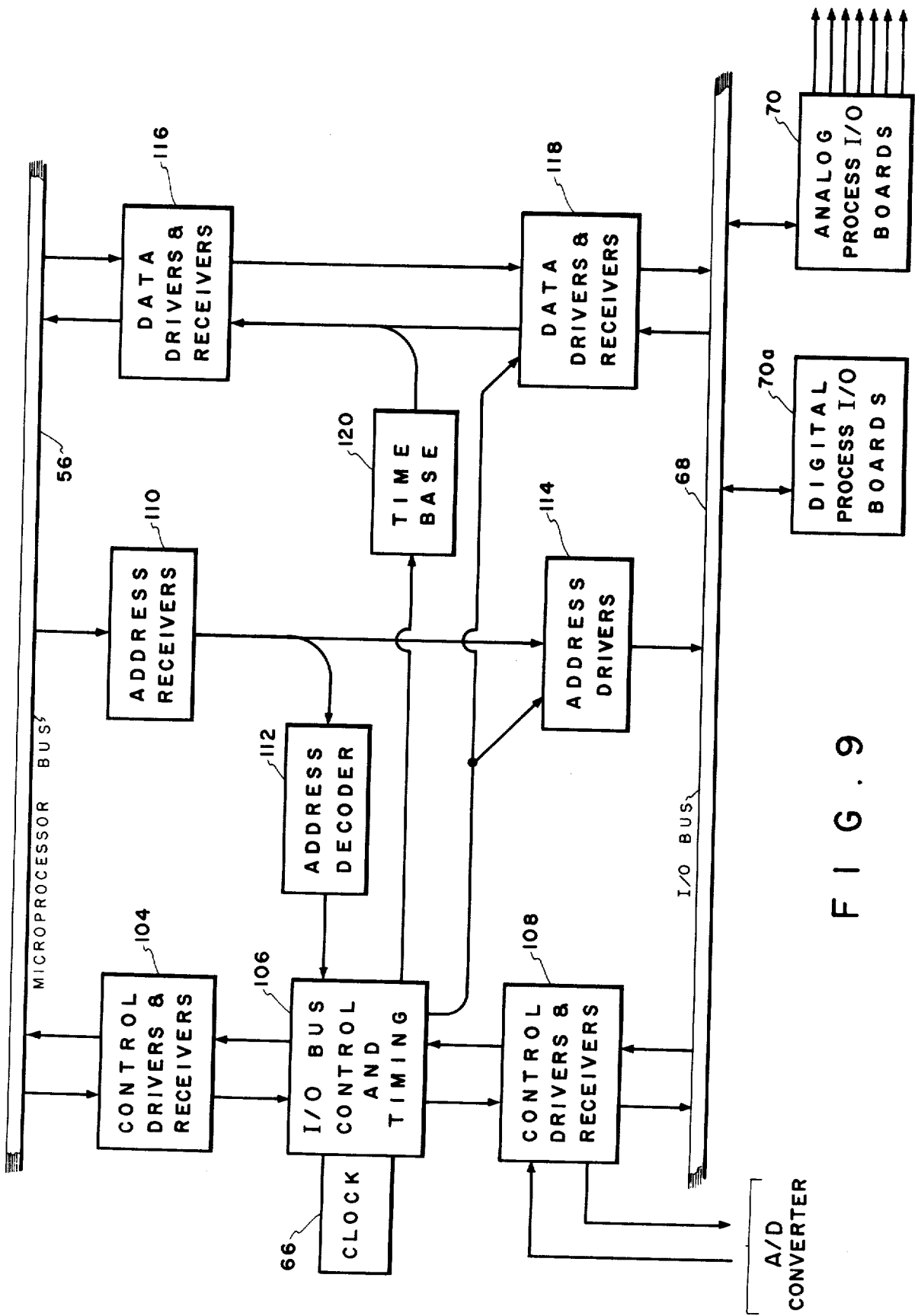
FIG. 9 is a block diagram of the process I/O controller portion of the apparatus shown in FIG. 5.

The process I/O controller 64 of the PIU 14 or 16, shown in FIGS. 1 and 5, is also shown in greater detail in FIG. 9. The process I/O controller, as shown in FIG. 9, includes, first, a control driver and receiver unit 104 including drivers and receivers connected to the appropriate conductors of the microprocessor bus 56. The control drivers and receivers unit 104 communicates with the I/O bus control and timing unit 106. The circuit 106 is conventional logic circuitry such as is well known to those skilled in the art; it may be similar to that illustrated in U.S. Pat. No. 4,010,448. The control and timing unit 106, in turn, communicates with the driver/receiver unit 108. The driver/receiver unit 108 includes the coupling amplifiers for communication with the process I/O bus 80. The driver/receiver unit 108 also includes means for coupling an A/D converter on the occasion of the input signals from the I/O bus 68 being analog signals. A second receiver unit 110 is connected to the microprocessor bus 56 to receive address data to identify particular output devices to which control signals will be transmitted. An address decoder circuit 112, one of several commercially available chips or modules, responds to the address information from the receiver unit 110 and translates that information into a data form useful in the operation of the I/O bus control and timing unit 106. In turn, the I/O bus control and timing unit 106 provides an enable signal for a set of line drivers 114 which provides the address information to the process I/O bus 68. A third unit 116 connected to the microprocessor bus 56 is a data drivers and receivers unit. These communicate with corresponding drivers and receivers in a unit 118 which includes the drivers and receivers for the process I/O bus 68. The unit 118 is also controlled by enable signal means from the I/O bus control and timing unit 106. The drivers and receivers 104, 108, 110, 114, 116 and 118 may also be elements of the type shown in the aforementioned U.S. Pat. No. 3,983,540.

It will be recalled that the I/O bus 68, in the illustrative embodiment, may have up to thirty-two process I/O boards 70 connected thereto; each of the process I/O boards having a number of input or output devices responsive thereto. In certain types of control environments, in the event of a major fault, it is desirable to have available data relating to the status of particular parameters leading up to the fault condition. To this end, certain of the process I/O boards are designated to monitor such parameters and, when a change in that parameter is detected to transmit the signals back to the I/O bus controller with identifying signals. Thereupon, the I/O bus control and timing unit 106 supplies a time signal through a time base generator 120. The time base generator 120 produces a time indicating signal which is associated with the change signal, both signals then being transmitted back through the microprocessor bus to the RAM 62. More will be said about the feature hereinafter.

In the structure of the apparatus constructed in accordance with the present invention, the control algorithms for all of the lower level units is stored in the memory of the central processor unit 2. Under control of the CPU 2, the fixed values in the data base tables in the RAM 62 of the process interface units are established. In the PROM 60 of the process interface unit 14/16 is stored all of the constant values which may be used in manipulating raw data values received from the process input devices to produce linearized, normalized and compensated values. Selected ones of those constants are addressed in response to the identification of the configuration word of the data base table. Additionally, the PROM 60 includes the internal operating instructions for the process interface unit and is effected under control of the microprocessor unit 58. One feature of the programmatic control through the microprocessor unit 58 is the sequential scanning of all of the data input points associated with that process interface unit. For example, if there are 256 data input points 18 associated with the particular process interface unit, each of those 256 units will be periodically scanned; the data derived from those 256 points will then be manipulated in accordance with constants called forth by the configuration word and the thus adjusted word stored in the second address of the data base table associated with that particular data point. During the course of the manipulation of those words, the manipulations are lodged temporarily in the scratch pad portion of the RAM 62. If the value of any of the measured parameters exceeds the alarm limit values, those extra-criteria values are stored in the alarm tables portion of the RAM 62.

Referring back to the CPU 2, a series of command words are loaded into the command word table 48 (FIG. 4). These command words include not only the action command but also the address of the element concerned. When the system is operational, the command words are transmitted sequentially through the communication bus interface controller 8 to the data highway bus 6, thence to the process interface unit 14, 16, etc. As an example, the command word may request the status of the present value of a particular one of the data points. The address portion of the command word would be directed to the actual value slot in the data base table for that particular data point in the RAM 62. In response to that request, the information from the identified slot in the data base table will be, under the control of the microprocessor unit 58 in the process interface unit, transmitted from the RAM 62 back to the data highway communication bus 6. From the data highway 6, the reply data is transmitted to the communication bus interface controller 8 and stored in the temporary storage slot for DMA in the RAM 24. The information in the DMA temporary storage slot of the RAM 24 is transmitted directly to the appropriate address in the data word table 50 in the CPU memory without the necessity of interrupting the computational process of the CPU 2. When the command word requests information from an individual data point, the transmission between the process interface unit and the CPU is on a word by word basis; for one command word there will be a one word reply.

Figure 6:
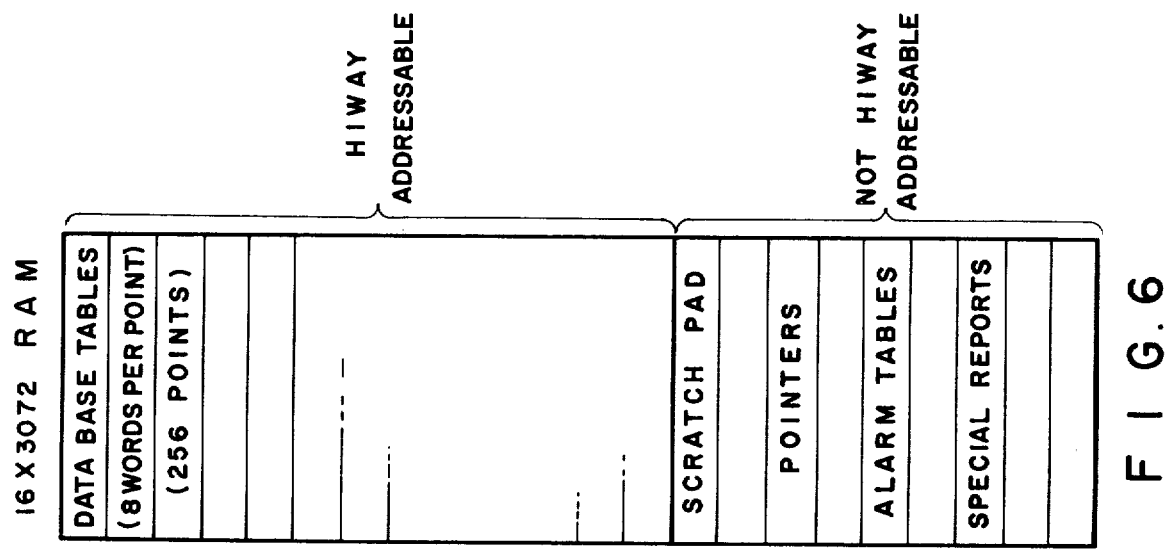
FIG. 6 is a diagram of the structure of the RAM included in the apparatus of FIG. 5.

On the other hand, the computer may generate a signal requiring a PIU or all of the PIU's associated with the data highway 6 to compile a list of the present status of all of the data points associated therewith. When the PIU receives such a command from the computer, the current actual value from each of the data base tables in the RAM 62 of that PIU are assembled in order in the special reports portion of that RAM. When the list in the special reports portion of the RAM has been completed, the PIU, again under the control of the microprocessor unit, signals the communication bus interface controller 8, requesting access to the highway 6 and to the central processor unit 2 through the communication bus 4. The grant of access to the communication buses, hence to the central processor unit 2, identifies the transmission as a block data transfer. With this configuration, the data in the special reports memory of the RAM 62 is transferred in a sequence of words comprising a block of data. Inasmuch as one of the functions of the communication bus interface controller 8 is to periodically interrogate the highway communication bus 6 to determine if any of the process interface units associated therewith has information which must be transferred to the CPU, there is a constraint imposed upon the length of the individual block of data which may be transmitted from the special reports section. In the exemplary embodiment hereinbefore referred to, the length of an individual transmission block of data is limited to sixty-four words. If, however, the special reports section of the RAM contained more than the sixty-four words, for example, a full complement of 256 words, the full list would be transmitted in successive blocks of sixty-four words each. The data words thus transmitted are, through the DMA capabilities of the communication bus interface controller 8, transmitted directly to a provided array in the memory of the CPU 2. In the discussion of the RAM shown in FIG. 6, it was indicated that one of the areas in the working memory was reserved for "pointers." In the alarm tables and special reports sections of the RAM, data words are stored in and read out on a FIFO basis. The "pointers" referenced herein are the indicators to keep track of the transactions in these tabular arrays. With the data being transferred in block form directly to the provided memory array of the CPU, there is a minimization of interrupts to the CPU.

It was mentioned that one of the functions of the communications bus interface controller 8 was to periodically interrogate, or poll, the PIU's along the communication bus 6 to determine if any of those PIU's have information that needs transmitting to the CPU. When the several data points associated with each of the PIU's are scanned and the results thereof stored in the actual value slot in the data base table, if that value lies outside of the alarm limit range, then the signal is also stored in an alarm table portion of the RAM 62. If there is such extra-criteria data stored in the alarm tables of the RAM 62 for any of the PIU's along the communication bus 6, when a poll signal is sent out from the communication bus interface controller 8, the PIU having such data in its alarm table will respond affirmatively to the poll. In response to an affirmative reply from the PIU, the communication bus interface controller 8 will grant access to the communication buses to the PIU's with the affirmative response, in order of their priority. The extra-criteria data in the alarm tables will then be transmitted under the control of the microprocessor unit 58 in the individual PIU to the data highway bus 6 in block data form, as hereinbefore described, for loading into the Attention Data Word List in the CPU memory.

As was earlier mentioned, there are control situations wherein it is desirable to know the value or condition of certain parameters immediately prior or leading up to a major fault or other previously identified condition. An example of a control situation where such monitoring is highly desirable is in the field of electrical energy generation and/or distribution. The anticipatory data would be helpful in identifying the cause of a failure of a generation or distribution system. To accomplish that, selected ones of the parameter sensing devices 18a associated, for example, with a digital process input board 70a, are arranged to monitor the selected parameters. When changes are detected in those parameters, a signal is developed which is transmitted through the digital process input board 70a to the process I/O controller 64 by way of the I/O bus 68. Signals from these input devices are identified as to their purpose and that identification is detected by the process I/O controller 64. For example, the identification portion of the signal would be detected by the control receivers in the unit 108 and applied to the I/O bus control and timing unit 106. Within the I/O bus control and timing unit 106, there is a timing clock signal generator 66. That clock 66 provides the basic timing control for all of the operations of the process I/O controller. One of the special aspects of the timing control function is the control of a time base signal generator 120. The time base signal generator, in accordance with the hereinbefore referenced exemplary apparatus, produces a signal indicative of the lapse of time with a resolution of one millisecond. For those signals which are representative of the parameters which are monitored as being of interest relative to the aforementioned fault, the time base signal coincident with the occurrence of that signal is read out by the microprocessor 58 and superimposed upon that signal. The data signal, together with the appropriate time-tag signal is stored in the alarm tables of the RAM. The occurrence of those signals in the RAM 62 results in an interrupt signal being produced through the interface controller 8 which is recognized in the control mechanism of the PIU and called forth by the CPU 2 for analysis as to the probable cause of the fault which followed the change of state in those monitored parameters. Because these parameter signals are time-tagged by operation of the time base generator 120, the order of occurrence of the changes in the parameters will be recorded. The proper analysis of the ensuing fault is greatly enhanced by the ability to identify the sequence of events leading to the fault or questioned condition. The sequence of events signals are transmitted to the CPU 2 from the RAM 24 in block data transfer form, for storage in the attention data word list.

In carrying forward the idea of minimizing traffic on the data bus 6 and the effort required of the CPU 2, there are several commands issued by the CPU 2 which are "global commands" all of the PIU's respond. One such global command is a synchronization signal which simultaneously resets the time base signal generator 120 in all of the process I/O controllers 64 in all of the PIU's. Another such global command is an instruction to all of the PIU's to assemble a special report of the status of all or selected ones of the data points. The polling signal issued by the interface controller 8 or traffic detector 12 is also a global type command. In other situations, the commands issued by the CPU 2 include the address of the particular unit which is expected to respond. In those instances, only the addressed data point or PIU will respond. The ability, however, to issue such a global command in the appropriate situations again effects a substantial saving of traffic on the data highway and of activity by the control function of the CPU.

A still further saving in traffic on the data highway and interruptive activity of the control feature of the CPU is effected in the manner of reporting. As was mentioned, the CPU 2 has the power to request selected data from any addressable data point and receive a reply to that request. In previous systems, the scanning of the data points required that the derived data be transmitted back to the CPU from all of the scanned data points each scanning cycle. In the present system, since each PIU manipulates the data to determine the relative value of the signal, only changed values or alarm values are reported back to the CPU. As long as the controlled system is operating reasonably within the appointed range, little to no data is automatically reported back to the CPU. Thus, reporting to the CPU is on the basis of reporting by exception. Thus, there has been provided an improved distributed control system which features greater versatility at the lower control level and effects greater economy and efficiency of operation of the CPU while effecting an improved speed of communication between the CPU and the lower level control units by a more efficient use of the data bus highway.

The embodiment of the invention in which an exclusive property or privilege is claimed are defined as follows:

1. A process control computer system comprising:
   a central processor unit as a primary controller;
   said central processor including a main computer memory and a control unit;
   a two conductor communication bus;
   an interface control unit including direct memory access with respect to said main computer memory, said interface control unit being interconnected between said central processor unit and said communication bus;
   a plurality of process data point devices including input and output devices; and
   a process interface unit connected to interface between said process data point devices and said communication bus;
   said process interface unit including a microprocessor unit, local memory means operative under the control of said microprocessor unit, means further controlled by said microprocessor unit for continuously gathering data from said input data point devices, means including said microprocessor unit for manipulating said gathered data in accordance with selected instructions, means under the control of said microprocessor unit for storing said manipulated data in said local memory means, said manipulated data being compared within said process interface unit with predetermined criteria stored in said local memory means to detect extra-criteria data, means for storing said extra-criteria data in said local memory means, means including said microprocessor unit for transmitting said stored extra-criteria data by way of said communication bus and said direct memory access to said central process unit while retaining said manipulated data in said local memory, said process interface unit including means for receiving from said central processor unit, by way of said communication bus, output control signals, and means including said microprocessor unit for transmitting said output control signals to designated output data point devices.

2. A process control computer system comprising:
   a central processor unit as a primary controller;
   said central processor including a main computer memory and a control unit;
   a two conductor communication bus;
   an interface control unit including direct memory access with respect to said main computer memory, said interface control unit being interconnected between said central processor unit and said communication bus;

a plurality of process data point devices including input and output devices; and a process interface unit connected to interface between said process data point devices and said communication bus;

said process interface unit including a microprocessor unit, local memory means operative under the control of said microprocessor unit, means further controlled by said microprocessor unit for continuously gathering data from said input data point devices, means including said microprocessor unit for manipulating said gathered data in accordance with selected instructions, means under the control of said microprocessor unit for storing said manipulated data in said local memory means, said manipulated data being compared within said process interface unit with predetermined criteria stored in said local memory means to detect extra criteria data, means for storing said extra-criteria data in said local memory means, means including said microprocessor unit for transmitting said stored extra-criteria data by way of said communication bus and said direct memory access to said central processor unit while retaining said manipulated data in said local memory, said process interface unit including means for receiving from said central processor unit, by way of said communication bus, output control signals, and means including said microprocessor unit for transmitting said output control signals to designated output data point devices;

said interface control unit including means for controlling the flow of data between central processor unit and said communication bus, including means for converting between serial data transmission on said communication bus and parallel data transmission to and from said central processor.

3. A process control computer system comprising:

a central processor unit as a primary controller;

said central processor including a main computer memory and a control unit;

a two conductor communication bus;

an interface control unit including direct memory access with respect to said main computer memory, said interface control unit being interconnected between said central processor unit and said communication bus;

a plurality of process data point devices including input and output devices; and a process interface unit connected to interface between said process data point devices and said communication bus;

said process interface unit including a microprocessor unit, local memory means operative under the control of said microprocessor unit, means further controlled by said microprocessor unit for continuously gathering data from said input data point devices, means including said microprocessor unit for manipulating said gathered data in accordance with selected instructions, means under the control of said microprocessor unit for storing said manipulated data in said local memory means, said manipulated data being compared within said process interface unit with predetermined criteria stored in said local memory means to detect extra-criteria data, means for storing said extra-criteria data in said local memory means, means including said microprocessor unit for transmitting said stored extra-criteria data by way of said communication bus and said direct memory access to said central processor unit while retaining said manipulated data in said local memory, said process interface unit including means for receiving from said central processor unit, by way of said communication bus, output control signals, and means including said microprocessor unit for transmitting said output control signals to designated output data point devices, said process interface unit also including a microprocessor unit for controlling and effecting the internal operation of said process interface unit;

said process interface unit including means including said microprocessor unit responsive to commands from said central processor control unit for assembling in said local memory means blocks of data from said data point devices and transmitting said assembled data in block form, through said interface control unit directly to said main computer memory.

4. A process control computer system comprising:

a central processor unit as a primary controller;

said central processor unit including a main computer memory and a control unit;

a two conductor communication bus;

an interface control unit including direct memory access with respect to said main computer memory, said interface control unit being interconnected between said central processor unit and said communication bus;

a plurality of process data point devices including input and output devices;

a process interface unit connected to interface between said process data point devices and said communication bus;

said process interface unit having a local memory means, including a random access memory unit and a read only memory unit, and a microprocessor unit for controlling the internal operation of said process interface unit; said read only memory unit including instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, said identifying symbols identifying selected ones of said reference data;

said process interface unit having means, including said microprocessor unit, for continuously gathering data from said input data point devices, for manipulating said gathered data in accordance with said selected ones of said reference data and for storing said manipulated data in assigned portions of said random access memory to be available on request from said central process unit for transmission to said central processor unit by way of said communication bus and said direct memory access; said process interface unit also having means including said microprocessor unit and said random access memory unit for receiving output control signals from said central processor unit by eay of said communication bus and for transmitting said output control signals to designated output data point devices.

5. In a process control computer system:

a central processor unit as a primary controller, said central processor unit including a main computer memory and a control unit;

a two conductor communication bus;

an interface control unit including direct memory access with respect to said main computer memory, said interface control unit being interconnected between said central processor unit and said communication bus;

a plurality of process data point devices;

a process interface unit connected to interface between said process data point devices and said communication bus;

said process interface unit having a local memory means; including a random access memory unit and a read only memory unit, and a microprocessor unit for controlling the internal operation of said process interface unit; said read only memory unit including instructions for the operation of said microprocessor unit, said programmable read only memory unit further including control data relative to said data point devices, said process interface unit being responsive to instructions from said central processor unit by way of said communication bus to store identifying data symbols in selected portions of said random access memory unit, said identifying symbols identifying selected ones of said control data, said process interface unit being futher responsive to instructions from said central processor unit to store reference data values in correlated selected portions of said random access memory, said reference data values being correlated with data from said data point devices, and said process interface unit having means including said microprocessor unit for continuously gathering data from said data point devices, for manipulating said gathered data in accordance with said control data and for comparing the manipulated data with said reference data values to determine the condition of said manipulated data.

6. The process control computer system as set forth in claim 5 and characterized further in that said process interface unit under control of said microprocessor unit includes means for testing the manipulated data relative to said reference data values to determine if an alarm condition exists, and to store alarm condition data in a designated table in said random access memory for transmission to said central processor unit by way of said communication bus and said direct memory access.

7. In a process control computer system:

a central processor unit as a primary controller;

said central processor unit including a main computer memory and a control unit;

a two conductor communication bus;

an interface control unit including direct memory access with respect to said main computer memory, said interface control unit being interconnected between said central processor unit and said communication bus;

a plurality of process data point devices;

a process interface unit connected to interface between said process data point devices and said communication bus;

said process interface unit having a local memory means, including a random access memory unit and a read only memory unit, and a microprocessor unit for controlling the internal operation of said process interface unit; said read only memory unit including instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, said identifying symbols identifying selected ones of said reference data, said process interface unit having means including said microprocessor unit for continuously gathering data from said data point devices, for storing said gathered data in assigned portions of said random access memory unit, for comparing said reference data with said gathered data from correlated data point devices to detect an occurrence of an alarm condition, for storing data from selected ones of said data point devices in designated portions of said random access memory unit, and means to time-tag said data from said selected data point devices to provide a sequence of events record of the activity of the selected data points, an interrupt signal being issued to said central process unit by way of said communication bus on the occurrence of a predetermined alarm condition.

8. The process control computer system as set forth in claim 7 wherein said selected ones of said data points are determined by certain ones of said identifying data symbols stored in said selected portions of said random access memory.

9. In a process control computer system:

a central process unit as a primary controller;

said central processor unit including a main computer memory and a control unit;

a two conductor communication bus;

an interface control unit including direct memory access with respect to said main computer memory, said interface control unit being interconnected between said central processor unit and said communication bus;

a plurality of process data point devices;

a process interface unit connected to interface between said process data point devices and said communication bus;

said process interface unit having a local memory means, including random access memory unit and a read only memory unit, and a microprocessor unit for controlling the internal operation of said process interface unit; said read only memory unit including instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, said identifying symbols identifying selected ones of said reference data, said process interface unit having means including said microprocessor unit for cyclically scanning all of the data point devices associated therewith, for gathering data from said scanned data point devices, manipulating said gathered data in accordance with said instructions from said central processor unit, for storing said manipulated data in assigned portions of said random access memory, for comparing said manipulated data with said reference data, for assembling selected exception and change data in a designated portion of said random access memory, and for reporting said selected data to said central processor unit by way of said communication bus and said direct memory access.

10. The process control computer system as set forth in claim 9 wherein means are provided for time-tagging selected ones of said change data to provide a sequence of events identification for said selected change data.

11. In a process control computer system:

a central processor unit as a primary controller;
said central processor unit including a main computer memory and a control unit;
a communication bus;
an interface control unit, including direct memory access with respect to said main computer memory, connected for controlling the interchange of signals between said central processor unit and said communication bus;
a plurality of process data point devices, and
a process interface unit connected to interface between said process data point devices and said communication bus;
said process interface unit including a microprocessor unit, local memory means operative under the control of said microprocessor unit, means further controlled by said microprocessor unit for continuously gathering data from said point devices, means including said microprocessor unit for manipulating said gathered data in accordance with selected instructions, means under the control of said microprocessor unit for storing said manipulated data in said local memory means, said manipulated data being compared within said process interface unit with predetermined criteria stored in said local memory means to detect extra-criteria data, means for storing said extra-criteria data in said local memory means, means including said microprocessor unit for transmitting said stored extra-criteria data by way of said communication bus and said direct memory access to said central processor unit while retaining said manipulated data in said local memory.

12. In a process control computer system:

a central processor unit as a primary controller;
said central processor including a main computer memory and a control unit;
a communication bus;
an interface control unit, including direct memory access with respect to said main computer memory, connected for controlling the interchange of signals between said central processor unit and said communication bus;
a plurality of process data point devices;
a process interface unit connected to interface between said process data point devices and said communication bus;
said process interface unit including a microprocessor unit, local memory means operative under the control of said microprocessor unit, means further controlled by said microprocessor unit for continuously gathering data from said data point devices, means including said microprocessor unit for manipulating said gathered data in accordance with selected instructions, means under the control of said microprocessor unit for storing said manipulated data in said local memory means, said manipulated data being compared within said process interface unit with predetermined criteria stored in said local memory means to detect extra-criteria data, means for storing said extra-criteria data in said local memory means, means including said microprocessor unit for transmitting said stored extra-criteria data by way of said communication bus and said direct memory access to said central processor unit while retaining said manipulated data in said local memory;
said process interface unit including means including said microprocessor unit responsive to commands from said central processor unit by way of said communication bus for assembling in said local memory means blocks of data from said data point devices and transmitting said assembled data in block form, through said interface control unit by way of said communication bus directly to said main computer memory.

13. In a process control computer system:

a central processor unit as a primary controller;
said central processor unit including a main computer memory and a control unit;
a communication bus;
an interface control unit, including direct memory access with respect to said main computer memory, connected for controlling the interchange of signals between said central processor unit and said communication bus;
a plurality of process data point devices;
a process interface unit connected to interface between said process data point devices and said communication bus;
said process interface unit having a local memory means, including a random access memory unit and a read only memory unit, and a microprocessor unit for controlling the internal operation of said process interface unit, said read only memory unit including program instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, asid identifying symbols identifying selected ones of said reference data;
said process interface unit having means, including said microprocessor unit, for continuously gathering data from said data point devices, for manipulating said gathered data in accordance with said selected ones of said reference data and for storing said manipulated data in assigned portions of said random access memory to be available on request from said central processor unit for transmission to said central processor unit by way of said communication bus and said direct memory access.

14. In a process control computer system:

a central processor unit as a primary controller;
said central processor unit including a main computer memory and a control unit;
a communication bus;

an interface control unit, including direct memory access with respect to said main computer memory, connected for controlling the interchange of signals between said central processor unit and said communication bus;

a plurality of process data point devices;

a process interface unit connected to interface between said process data point devices and said communication bus;

said process interface unit having a local memory means, including a random access memory unit and a read only memory unit, and a microprocessor unit for controlling the internal operation of said process interface unit; said read only memory unit including instructions for the operation of said microprocessor unit, said read only memory unit further including control data relative to said data point devices, said process interface unit being responsive to instructions from said central processor unit by way of said communication bus to store identifying data symbols in selected portions of said random access memory unit, said identifying symbols identifying selected ones of said control data, said process interface unit being further responsive to instructions from said central processor by way of said communication bus to store reference data values in correlated selected portions of said random access memory, said reference data values being correlated with data from said data point devices, and said process interface unit having means including said microprocessor unit for continuously gathering data from said data point devices, for manipulating said gathered data in accordance with said control data and for comparing the manipulated data with said reference data values to determine the condition of said manipulated data.

15. In a process control computer system:

a central processor unit as a primary controller;

said central processor unit including a main computer memory and a control unit;

a communication bus;

an interface control unit, including direct memory access with respect to said main computer memory, connected for controlling the interchange of signals between said central processor unit and said communication bus;

a plurality of process data point devices;

a process interface unit connected to interface between said process data point devices and said communication bus;

said process interface unit having a local memory means, including a random access memory unit and a read only memory unit, and a microprocessor unit for controlling the internal operation of said process interface unit; said read only memory unit including instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, said identifying symbols identifying selected ones of said reference data;

said process interface unit having means including said microprocessor unit for gathering data from of said data point devices, for storing said gathered data in assigned portions of said random access memory unit, for comparing said reference data with said gathered data from correlated data points devices to detect an occurrence of an alarm condition, for storing data from selected ones of said data points devices in designated portions of said random access memory unit, and means to time-tag said data from said selected data point devices to provide a sequence of events record of the activity of the selected data points, an interrupt signal being issued to said central processor unit by way of said communication bus on the occurrence of a predetermined alarm condition.

16. The process control computer system as set forth in claim 15 wherein said selected ones of said data points is determined by said certain ones of said identifying data symbols stored in said selected portions of said random access memory.

17. In a process control computer system:

a central processor unit as a primary controller;

said central processor unit including a main computer memory and a control unit;

a communication bus;

an interface control unit, including direct memory access with respect to said main computer memory, connected for controlling the interchange of signals between said central processor unit and said communication bus;

a plurality of process data point devices;

a process interface unit connected to interface between said process data point devices and said communication bus;

said process interface unit having a local memory means, including a random access memory unit and a read only memory unit, and a microprocessor unit for controlling the internal operation of said process interface unit; said read only memory unit including instructions for the operation of said microprocessor unit, said read only memory unit further including reference data relative to said data point devices, said process interface unit being responsive to instructions from said central processor unit by way of said communication bus to store identifying data symbols in selected portions of said random access memory unit, said identifyng symbols identifying selected ones of said reference data;

said process interface unit having means including said microprocessor unit for cyclically scanning all of the data point devices associated therewith, for gathering data from said scanned data point devices, manipulating said gathered data in accordance with said instructions from said central processor unit by way of said communication bus, for storing said manipulated data in assigned portions of said random access memory, for comparing said manipulated data with said reference data, for assembling selected exception and change data in a designated portion of said random access memory, and for reporting said selected data to said central processor unit by way of said communication bus and said direct memory access.

18. The process control computer system as set forth in claim 17 wherein means are provided for time-tagging selected ones of said change data to provide a sequence of events identification for said selected change data.

* * * * *